United States Patent [19]

Pai

[11] Patent Number: 4,845,408
[45] Date of Patent: Jul. 4, 1989

[54] COMPACT FLUORESCENT LAMP ASSEMBLY

[75] Inventor: Robert Y. Pai, Hamilton, Mass.

[73] Assignee: GTE Products Corporation, Danvers, Mass.

[21] Appl. No.: 147,020

[22] Filed: Jan. 19, 1988

Related U.S. Application Data

[63] Continuation of Ser. No. 939,291, Dec. 4, 1986, abandoned, which is a continuation of Ser. No. 678,929, Dec. 6, 1984, abandoned.

[51] Int. Cl.⁴ .............................................. H05B 41/14
[52] U.S. Cl. ................................. 315/238; 315/227 R; 313/609
[58] Field of Search ...................... 315/99, 227 R, 237, 315/238, 240, 244, 245, DIG. 5; 313/493, 609

[56] References Cited

U.S. PATENT DOCUMENTS 2,356,369  8/1944  Abernathy ........................... 315/245
3,988,633  10/1976  Shurgan et al. ...................... 313/493
4,284,925  8/1981  Bessone et al. ...................... 315/244
4,288,725  9/1981  Morton ................................. 315/99

OTHER PUBLICATIONS

J. Light & Vis. Env., vol. 7, No. 1, 1983, Watanabe, Y., "Capacitor Ballast for a Compact Fluorescent Lamp", pp. 7-14.

Primary Examiner—Benedict V. Safourek
Assistant Examiner—T. Salindong
Attorney, Agent, or Firm—Carlo S. Bessone

[57] ABSTRACT

A fluorescent lamp assembly for operation from a source of AC line voltage. The assembly includes a fluorescent lamp having an arc length not greater than about 120 mm and an envelope which includes at least one constricting portion located therein for constricting the plasma discharge to provide an increase in the lamp voltage. Also included is a lead-type ballasting means which comprises a capacitor in one embodiment connected in series with the lamp.

12 Claims, 2 Drawing Sheets

COMPACT FLUORESCENT LAMP ASSEMBLY

This application is a continuation of application Ser. No. 678,929, filed 12/6/84, now abandoned, and a continuation of application Ser. No. 939,291, filed Dec. 4, 1986, now abandoned.

CROSS-REFERENCE TO RELATED APPLICATIONS

This application discloses subject matter related to that in U.S. Ser. Nos. 678,959; 678,958; 678,928; 678,957 now U.S. Pat. No. 4,585,468; and 678,930, now U.S. Pat. No. 4,582,523, filed concurrently herewith, and assigned to the Assignee of this application, but does not claim the inventions claimed in such related applications.

BACKGROUND OF THE INVENTION

This invention relates to a fluorescent lamp assembly and, in particular, to a fluorescent lamp assembly which is compact, lighweight and efficient.

The fluorescent lamp is one of the most widely utilized light source in the world for general illumination, primarily because of its relatively low initial cost and its efficacy; i.e., its light output relative to its power input, usually expressed as lumens per watt (LPW). Nevertheless, for home use, the fluorescent lamp has not taken precedence over the incandescent lamp. Many reasons have been advanced for this lack of acceptance, among them the poor color rendition of some fluorescent lamps and their need for a ballast. However, one of the major disadvantages lies in the fact that a fluorescent lamp is a linear light source whereas an incandescent lamp can almost be considered a point source.

It is desirable to have the combination of lamp and ballast as compact, lightweight and efficient as possible.

One such lightweight ballast is disclosed in U.S. Pat. No. 3,996,493 dated Dec. 7, 1986 to Davenport et al. This patent discloses an integral self-contained fluorescent lamp unit comprising a conventional, elongated lamp and an elongated ballast resistor carried in an outwardly extending housing member positioned alongside the lamp. The use of a resistive ballast is lighter in weight and less expensive than an inductive ballast; however, the system is less efficient.

Another lightweight ballast is disclosed in U.S. Pat. No. 4,288,725 dated Sept. 8, 1981 to Morton. The Morton patent discloses a lightweight starting and operating ballasting means for starting and operating a conventional fluorescent lamp utilizing a series connected resistor and capacitor.

Fluorescent lighting systems, as mentioned above, which use purely or partly resistive ballasting both consume unnecessary power and are generally inefficient.

Capacitors, which are lightweight and consume very little power, have not been used independently to ballast to conventional fluorescent lamps. In low frequency (50-60 Hertz) a.c. current circuits, the purely capacitive ballast produces instability in the discharge and destructively high current crest factors (i.e. the ratio of the peak value of current to the average value).

Short arc length fluorescent lamps (i.e. less than about 120 mm) have been found to operate on capacitive ballasts without instability and high current crest factors. The lamp voltage upon reignition in each half cycle so the line voltage can be less than the average voltage. The voltage is not redistributed on reignition and the capacitor does not need to be charged up immediately. Consequently, there is no current spike at reignition.

The conventional short arc length, low voltage fluorescent lamps operating on a capacitor (or inductor) usually have a low efficiency, since the shorter discharge path results in relatively smaller power dissipation in the positive column.

BRIEF SUMMARY OF THE DISCLOSURE

It is, therefore an object of this invention to obviate the disadvantages of the prior art.

It is a more particular object of this invention to provide a fluorescent lamp assembly which is compact, lightweight and efficient.

These objects are accomplished, in one aspect of the invention, by the provision of a fluorescent lamp having an envelope of substantially circular configuration in cross-section. The envelope has a first end portion with a first electrode which includes a first and second terminal. A second end portion is provided with a second electrode which includes a first and second terminal. The envelope is coated with at least one phosphor layer and encloses an inert starting gas and a quantity of mercury. The lamp, which has an arc length between the first and second electrodes not greater than about 120 mm, includes at least one constricting portion located in the envelope for constricting the plasma discharge to provide an increase in the voltage across the lamp. The constricting portion extends substantially about the circular periphery of the envelope and projects therein.

A lead-type ballasting means is connected in series with the lamp. The lead-type ballasting means, in a preferred embodiment, comprises a capacitor. In some instances, a resistor is connected in series with the capacitor and lamp for stability.

A starter means is connected to the lamp and may comprise, for example, a conventional glow-bottle starter or an electronic-type starter.

DETAILED DESCRIPTION OF THE PREFERRED EMBODIMENT

For a better understanding of the present invention, together with other and further objects, advantages, and capabilities thereof, reference is made to the following disclosure and appended claims taken in conjunction with the above described drawings.

Figure 1:
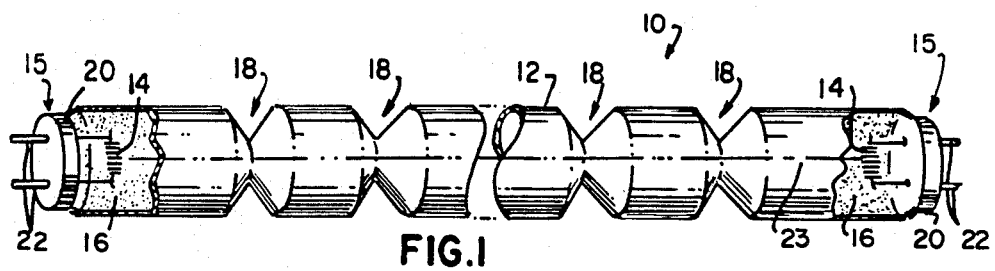
FIG. 1 is a perspective view of a lamp having constricting portions.

Referring now to the drawings with greater particularity FIG. 1 shows a preferred embodiment of a fluorescent lamp 10 for use in the assembly of the invention. The lamp 10 includes an envelope 12 of substantially circular configuration in cross-section which is generally made of light-transmitting soda-lime or lead glass. The maximum outside diameter of envelope 12 is preferably 19 mm (i.e. T6) or greater. Each end portion 15 of envelope 12 is provided with an electrode 14. The arc length distance which is the distance between electrodes 14 is not greater than about 120 mm. Preferably the arc length is within the range of from about 60 mm to about 120 mm. At least one phosphor layer 16 is disposed on the interior surface of envelope 12. Envelope 12 encloses an ionizable medium including a quantity of mercury and an inert starting gas. The gas may consist of argon, neon, helium or other inert gas or a combination thereof at a low pressure in the range of about 1 to 4 mmHg. Lamp 10 may include end caps 20 with corresponding electrical terminals 22 attached at each end. Although an end cap 120 with a pair of terminals 22 is shown in FIG. 1, the present invention is also applicable to other end cap types, for example single pin or recessed pins. The lamp may be without conventional end caps, e.g., as in the case of an integral lamp-/ballast package; each of the lamp ends in this case can be contained within a housing made of plastic or other suitable material. The lamp envelope configuration may differ from the tubular-shaped lamp shown in FIG. 1. The lamp enveloped, for example, may be bent in the shape of a U, in which case both ends of the lamp can be contained within a single housing, which may also include a ballasting means and a starter means.

Figure 2:
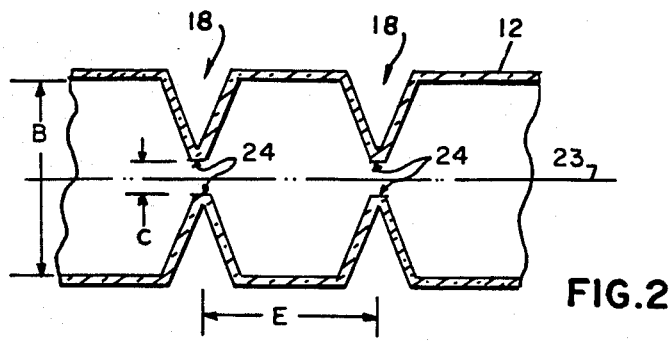
FIG. 2 is a partial longitudinal cross-sectional view of the lamp of FIG. 1.

The envelope 12 includes at least one or preferably a plurality of constricting portions 18, axially spaced apart and extending substantially about the circular periphery of the envelope 12. Each of the constricting portions 18, as shown in the partial cross-sectional views of FIGS. 2 and 3, contains a defined end segment 24 projecting within the envelope 12. End segment 24 is that section of the constricting portion 18 which deviates from the angle of the sidewalls 26. The cross-section of end segment 24 need not have a flat surface (as shown for 24) but may have a curved or bowed surface, illustrated as 24'. An arc length a is 23 is defined by an imaginary line extending from one electrode to the other electrode passing through the cross-sectional midpoint of the entire envelope.

Theoretically, the length A of end segment 24 should be not be more than the electron energy relaxation distance $d_r$ for the conditions of the discharge within the lamp (i.e., gas type, gas pressure, electron temperature, etc.) The electron energy relaxation distance $d_r$ is a well known quantity which, in a low pressure positive column discharge, is defined by the equation:

$$d_r^{-1} = [(3P_{Hg}Q_{in}^{Hg} + 3P_R Q_{in}^R)(P_{Hg}Q^{Hg} + P_R Q^R)]^{\frac{1}{2}}$$

where
$P_{Hg}$ is the mercury number density in the vapor
$P_R$ is the rare gas number density
$Q_{in}^{Hg}$ is the total in elastic scattering cross-section for the electrons by Hg.
$Q_{in}^R$ is the total inelastic scattering cross-section for the electrons by gas
$Q^{Hg}$ is the total elastic scattering cross-section for electrons by Hg.
$Q^R$ is the total elastic scattering cross-section for electrons by gas.

Since electron energy relaxation is known to be a continuously occurring process, the length A is not expected to be exactly $d_r$. Empirically, the length A of the end segment can be within the range of from about 0.02 to 1 times the electron energy relaxation distance $d_r$. Generally A is within the range of from about 0.1 millimeter to about 2.0 millimeters. For example, for a neon fill gas at a pressure of 2 torr at 25° C., $d_r$ equals approximately 5 mm; for argon at a pressure of 2 torr at 25° C., $d_r$ equals approximately 1.5 mm.

The preferred lamp 10 contains constricting portions 18 which are all of substantially uniform depth and shape and are spaced apart equally by a separation distance E. The distance E is measured axially within the envelope between the midpoints of the end segments of a pair of adjacent constricting portions. Changing the value E affects both the voltage generated across the lamp and also the efficiency of light generated. It has been found that E should be equal to at least the difference between the maximum internal diameter B and the minimum internal diameter C of the envelope for proper relaxation of the plasma discharge. Typical values for the separation distance are within the range of from about 25 millimeters to about 100 millimeters.

Significant increases in lamp voltage can be achieved when the ratio of the maximum internal diameter B of the envelope to the minmum internal diameter C is within the range of ratios B:C of about 2:1 to 10:1 or greater. At the same time, the length A should not be more than the electron energy relaxation distance $d_r$ of the lamp.

Figure 3:
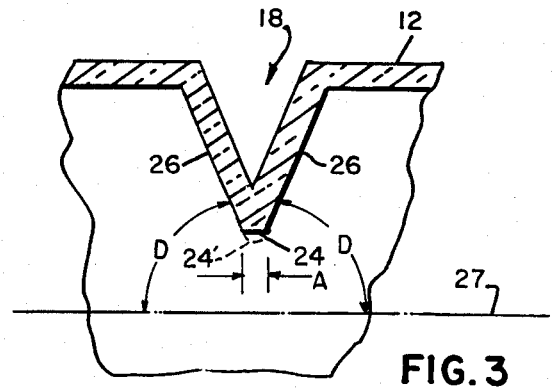
FIG. 3 is an enlarged partial cross-sectional view of the lamp of FIG. 1.

As best shown in the enlarged partial cross-sectional view of FIG. 3, the cross-sectional shape of the each constricting portion 18 of the envelope 12 is substantially in the form of a V having an end segment 24 and a pair of opposed sidewalls 26. Constricting portion 18 is preferably symmetrical about its center line; or in other words, each of the sidewalls 26 forms the same angle D with an imaginary line 27 parallel to the arc length axis 23. Preferably the sidewall angle D is within the range of from about 45 degrees to about 90 degrees.

In one example of a fluorescent lamp made with constricting portions 18, the envelope 12 was made of T17 size glass tubing having a maximum internal diameter B equal to about 52 mm. Three constricting portions 18 were formed in the envelope 12 having a separation distance E equal to about 50 mm, an axial end segment 24 length A of approximately 1 mm, and minimum internal envelope diameter C of 6 mm and sidewall angle D of 45°. The resulting ratio B:C was equal to 8.7:1. The fill gas used was 100 percent neon at a pressure of about 2.0 mmHg.

The following table shows the electrical parameters measured for both the above mentioned constricted lamp along with a control lamp (a similar T17 without constricting portions) operating on a standard 120 volt, 60 cycle lag-type ballast circuit. The arc length in both lamps was approximately 120 mm.

| | Control Lamp | Constricted Lamp |
| --- | --- | --- |
| Volts | 23.0 | 53.0 |
| Amperes | .450 | .460 |
| Watts | 10.0 | 23.0 |
| Lumens | 410 | 1000 |
| LPW | 41.0 | 43.5 |

The above table shows an increase in both lamp voltage and wattage for the constricted lamp. The constricted lamp yielded approximately 10 volts for each constriction.

The exact dependence of the increase in voltage on the parameters A,B,C,D and E are difficult to calculate due to the presence of many different interrelated processes which contribute to the discharge. However, certain general empirical relations can be made. Increases in the voltage per constriction were directly proportional to increases in the ratio B:C, the sidewall angle D, or the separation distance E.

Although the specific values of the voltage per constriction may vary for different values of the parameters A, B, C, D and E, a general trend in which a B:C constriction ratio of 2:1 to 3:1 yields a voltage per constriction of about 6 volts has been observed in other examples. The values used in examples for A were 1 mm to 2 mm; for B were 35 mm to 64 mm; for C were 3 mm to 15 mm; for D were 45° to 90°; for E were 25 mm to 40 mm. A neon gas fill of 2 torr and a mercury vapor density appropriate for 25° C. to 50° C. were used.

Figure 4:
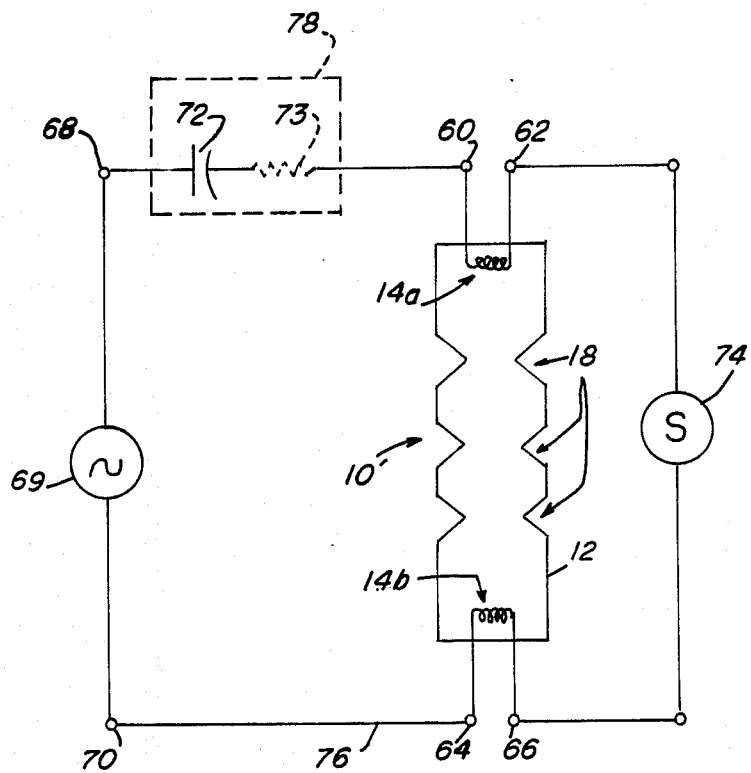
FIG. 4 is a schematic circuit diagram of an embodiment of a fluorescent lamp assembly according to the invention.

FIG. 4 shows a circuit diagram of one embodiment of a fluorescent lamp assembly according to the invention. A fluorescent lamp 10' is shown having an envelope 12 with a first end portion provided with a first electrode 14a including a first terminal 60 and a second terminal 62. A second end portion of envelope 12 is provided with a second electrode 14b which includes a first terminal 64 and a second terminal 66. Envelope 12 contains a plurality of constricting portions 18 as previously described.

A first input terminal 68 and a second input terminal 70 are provided for connection across a source 69 of AC line voltage.

A lead-type ballasting means 78 is connected between the first input terminal 68 and the first terminal 60 of first electrode 14a of the lamp 10'. Ballasting means 78 in FIG. 4 comprises a capacitor 72 of predetermined value chosen so as to obtain the desired lamp starting and operating parameters. Preferably, the value of capacitor 72 is within the range of from about 9 microfarads to about 30 microfarads. An optional resistor 73 of predetermined value may be included as part of lead-type ballasting means 78 and connected in series with capacitor 72. Resistor 73 is included to add additional ballasting if needed to obtain stable operation in some instances. Preferably, the value of resistor 73 is within the range of from about 5 ohms to about 10 ohms.

A starter means 74, which may be in the form of a conventional glow-bottle starter or an electronic-type starter for instance, is connected between the second terminals 62 of the lamp electrode 14a and the second terminal 66 of the lamp electrode 14b.

A connecting means 76, which may be in the form of for example a wire conductor, wire connector, or solder joint, connects the first terminal 64 of lamp electrode 14b to the second input terminal 70.

In an example of a fluorescent lamp made in accordance with the invention and operated in a circuit as shown in FIG. 4, the envelope 12 of lamp 10' was made of T8 glass tubing (1.0 inch diameter of 25.4 mm). Two constricting portions were formed in the envelope to have a separation distance E equal to about 75 mm, an axial end segment 24 length A of approximately 1 mm, a minimum internal envelope diameter C of 12 mm and an angle D equal to about 60 degrees. The resulting ratio B:C was equal to 2:1. The arc length of the lamp was equal to 120 mm. The fill gas used was 100 percent neon at a pressure of about 2 mm Hg. The electrical parameters measured for the circuit of FIG. 4 with the value of capacitor 72 equal to 20 microfarads and resistor 73 not included were:

| | |
|---|---|
| Volts | 35.0 |
| Amperes | .940 |

| -continued | |
|---|---|
| Power | 28.7 |
| Current Crest Factor | 1.8 |
| Lumens | 1080 |
| LPW | 37.6 |

The manufacture of an envelope 12 with constrictions of the form as described may be accomplished by heating an envelope 12 of round cross-sectional configuration to the softening point of the glass. While the envelope 12 is under pressure, the constrictions 18 are pressed into the envelope 12 wall by a mold. Alternatively, the constrictions 18 can be formed by a ribbon machine type operation in which the heated envelope 12 is blown into shape within a mold.

After the glass envelope 12 is formed, the remaining steps for making a complete fluorescent, low pressure discharge lamp are identical to those for conventional lamps. Due to the relatively large opening at each constriction, a normal phosphor coating process, such as application of a slurry of phosphor in an organic or water base, can be used. The phosphor coated envelope is then processed into a fluorescent lamp in the usual conventional manner.

While there have been shown what are at present considered to be preferred embodiments of the invention, it will be apparent to those skilled in the art that various changes and modifications can be made herein without departing from the scope of the invention as defined by the appended claims.

I claim:

1. A fluorescent lamp assembly for operation from a source of AC line voltage comprising in combination:

a fluorescent lamp having an envelope of substantially circular configuration in cross-section, said envelope having a first end portion provided with a first electrode including first and second terminals and a second end portion provided with a second electrode including first and second terminals, at least one phosphor layer disposed on the interior surface of said envelope, an ionizable medium enclosed within said mercury for producing a plasma discharge when a predetermined voltage is applied across said electrodes, said plasma discharge defining an electron energy relaxation distance, the arc length between said first and second electrodes being not greater than about 120 mm, said envelope including at least one constricting portion located therein for constricting said plasma discharge to provide an increase in the voltage across said lamp, said constricting portion extending substantially about the circular periphery of said envelope and projecting therein;

first and second input terminals for connection across said source of line voltage;

lead-type ballasting means series connected between said first input terminal and said first terminal of the first electrode of said lamp, said lead-type ballasting means consisting of a capacitor of predetermined value during operation of said plasma discharge;

starter means connected between said second terminal of the first electrode of said lamp and said second terminal of the second electrode of said lamp; and means connecting said first terminal of the second electrode of said lamp to said second input terminal.

2. The fluorescent lamp assembly of claim 1 wherein said arc length is within the range of from about 60 mm to about 120 mm.

3. The fluorescent lamp assembly of claim 1 wherein said constricting portion includes a defined end segment thereon projecting within said envelope and having a length not more than said electron energy relaxation distance.

4. The fluorescent lamp assembly of claim 1 wherein said envelope comprises a plurality of constricting portions axially spaced apart and located therein, each of said constricting portions extending substantially about the circular periphery of said envelope and projecting therein.

5. The fluorescent lamp assembly of claim 4 wherein each of said constricting portions includes a defined end segment thereon projecting within said envelope and having a length not more than said electron energy relaxation distance.

6. The fluorescent lamp assembly of claim 1 wherein said predetermined capacitor value is within the range of from about 9 microfarads to about 30 microfarads.

7. A fluorescent lamp assembly for operation from a source of AC line voltage comprising in combination:
a fluorescent lamp having an envelope of substantially circular configuration in cross-section, said envelope having a first end portion provided with a first electrode including first and second terminals and a second end portion provided with a second electrode including first and second terminals, at least one phosphor layer disposed on the interior surface of said envelope, an ionizable medium enclosed within said envelope including an inert starting gas and a quantity of mercury for producing a plasma discharge when a predetermined voltage is applied across said electrodes, said plasma discharge defining an electron energy relaxation distance, the arc length between said first and second electrodes being not greater than about 120 mm, said envelope including at least one constricting portion located therein for constricting said plasma discharge to provide an increase in the voltage across said lamp, said constricting portion extending substantially about the circular periphery of said envelope and projecting therein;

first and second input terminals for connection across said source of line voltage;

lead-type ballasting means series connected between said first input terminal and said first terminal of the first electrode of said lamp, said lead-type ballasting means comprising a resistor means having a predetermined total value within the range of from about 5 ohms to about 10 ohms connected in series with a capacitor of predetermined value, said lead-type ballasting means not including a choke;

starter means connected between said second terminal of the first electrode of said lamp and said second terminal of the second electrode of said lamp; and means connecting said first terminal of the second electrode of said lamp to said input terminal.

8. The fluorescent lamp assembly of claim 7 wherein said arc length is within the range of from about 60 mm to about 120 mm.

9. The fluorescent lamp assembly of claim 7 wherein said constricting portion includes a defined end segment thereon projecting within said envelope and having a length not more than said electron energy relaxation distance.

10. The fluorescent lamp assembly of claim 7 wherein said envelope comprises a plurality of constricting portions axially spaced apart and located therein, each of said constricting portions extending substantially about the circular periphery of said envelope and projecting therein.

11. The fluorescent lamp assembly of claim 10 wherein each of said constricting portions includes a defined end segment thereon projecting within said envelope and having a length no more that said electron energy relaxation distance.

12. The fluorescent lamp assembly of claim 7 wherein said predetermined capacitor value is within the range of from about 9 microfarads to about 30 microfarads.

* * * * *